US006949207B2

(12) United States Patent
Jones et al.

(10) Patent No.: US 6,949,207 B2
(45) Date of Patent: *Sep. 27, 2005

(54) K-TYPE POLARIZER AND PREPARATION THEREOF

(75) Inventors: Todd D. Jones, Saint Paul, MN (US); Duane D. Fansler, Dresser, WI (US); Robert T. Fitzsimons, Jr., Minneapolis, MN (US); Wayne S. Mahoney, Saint Paul, MN (US); Kevin M. Lewandowski, Inver Grove Heights, MN (US); Michael S. Wendland, North Saint Paul, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 447 days.

This patent is subject to a terminal disclaimer.

(21) Appl. No.: 10/117,774

(22) Filed: Apr. 4, 2002

(65) Prior Publication Data

US 2003/0189264 A1 Oct. 9, 2003

(51) Int. Cl.[7] .......................... F21V 9/14; G02B 27/02; G02B 27/28

(52) U.S. Cl. ........................ 252/585; 359/437; 359/485

(58) Field of Search ........................... 252/585; 359/490

(56) References Cited

U.S. PATENT DOCUMENTS

| | | | | |
|---|---|---|---|---|
| 2,445,555 A | | 7/1948 | Binda | |
| 3,565,985 A | | 2/1971 | Schrenk et al. | |
| 3,647,612 A | | 3/1972 | Schrenk et al. | |
| 3,914,017 A | | 10/1975 | Bedell et al. | |
| 3,936,538 A | * | 2/1976 | Marshall et al. | 510/519 |
| 3,987,037 A | | 10/1976 | Bonham et al. | |
| 4,229,498 A | * | 10/1980 | Suzuki et al. | 428/212 |
| 4,293,585 A | | 10/1981 | Imada et al. | |
| 4,330,590 A | | 5/1982 | Vesley | |
| 4,336,363 A | | 6/1982 | Crivello | |
| 4,391,687 A | | 7/1983 | Vesley | |
| 4,396,646 A | | 8/1983 | Schuler et al. | |
| 4,493,807 A | * | 1/1985 | Vyvial et al. | 264/101 |
| 4,505,793 A | | 3/1985 | Tamoto et al. | |
| 4,544,724 A | * | 10/1985 | Sogah et al. | 526/270 |

(Continued)

FOREIGN PATENT DOCUMENTS

| | | |
|---|---|---|
| EP | 0 333 407 A2 | 9/1989 |
| EP | 1 057 623 A1 | 12/2000 |
| WO | WO 95/17691 | 6/1995 |
| WO | WO 97/21123 | 6/1997 |

OTHER PUBLICATIONS

Cael et al., "Molecular and Spectroscopic Properties of a Polarizer Based on a Block Copolymer of Vinylalcohol and Acetylene", Macromol. Symp., 154, pp. 45–57, (2000).

Crivello et al., "Redox Initiators for Cationic Polymerization: The Diaryliodonium Salt/Sn(II) Redox Couple", Makromol. Chem., 184, pp. 463–473, (1983).

Crivello et al., "Diaryliodonium Salts as Thermal Initiators of Cationic Polymerization", Journal of Polymer Science: Polymer Chemistry Edition, vol. 21, pp. 97–109, (1983).

(Continued)

*Primary Examiner*—Randy Gulakowski
*Assistant Examiner*—Timothy J. Kugel
(74) *Attorney, Agent, or Firm*—Kent S. Kokko

(57) ABSTRACT

A process for preparing a polarizer is described whereby a pre-polarizing article comprising an oriented, vinylalcohol polymer film layer, and an acid donor layer comprising a thermal acid generator, is exposed to radiant energy at a temperature sufficient to effect a partial dehydration of the vinylalcohol polymer to a vinylalcohol/poly(acetylene) copolymer.

47 Claims, 2 Drawing Sheets

U.S. PATENT DOCUMENTS

| | | | | | |
|---|---|---|---|---|---|
| 4,659,523 | A | | 4/1987 | Rogers et al. | |
| 4,772,534 | A | | 9/1988 | Kawamura et al. | |
| 4,772,663 | A | | 9/1988 | Marten et al. | |
| 4,818,624 | A | | 4/1989 | Downey, Jr. | |
| 4,833,179 | A | | 5/1989 | Young et al. | |
| 4,859,039 | A | | 8/1989 | Okumura et al. | |
| 4,895,769 | A | | 1/1990 | Land et al. | |
| 4,948,857 | A | | 8/1990 | Marten et al. | |
| 4,971,892 | A | | 11/1990 | Ali et al. | |
| 4,985,340 | A | | 1/1991 | Palazzotto et al. | |
| 4,988,607 | A | | 1/1991 | Ali | |
| 4,992,218 | A | | 2/1991 | Sugio et al. | |
| 5,112,882 | A | | 5/1992 | Babu et al. | |
| 5,153,104 | A | | 10/1992 | Rossman et al. | |
| 5,209,971 | A | | 5/1993 | Babu et al. | |
| 5,298,361 | A | | 3/1994 | Bonham | |
| 5,389,324 | A | | 2/1995 | Lewis et al. | |
| 5,461,134 | A | | 10/1995 | Leir et al. | |
| 5,554,664 | A | | 9/1996 | Lamanna et al. | |
| 5,558,904 | A | | 9/1996 | Hsieh et al. | |
| 5,578,404 | A | * | 11/1996 | Kliem | 430/7 |
| 5,589,122 | A | | 12/1996 | Leonard et al. | |
| 5,599,602 | A | | 2/1997 | Leonard et al. | |
| 5,639,903 | A | | 6/1997 | Takahashi et al. | |
| 5,666,223 | A | | 9/1997 | Bennett et al. | |
| 5,705,267 | A | | 1/1998 | Starzewski et al. | |
| 5,723,513 | A | | 3/1998 | Bonham et al. | |
| 5,773,834 | A | | 6/1998 | Yamamoto et al. | |
| 5,847,133 | A | | 12/1998 | Bonham | |
| 5,925,289 | A | | 7/1999 | Cael et al. | |
| 5,973,834 | A | * | 10/1999 | Kadaba et al. | 359/490 |
| 6,409,328 | B1 | * | 6/2002 | Ohkawa | 347/100 |
| 6,630,970 | B2 | * | 10/2003 | Trapani et al. | 349/96 |
| 2003/0002154 | A1 | * | 1/2003 | Trapani et al. | 359/492 |
| 2003/0017856 | A1 | * | 1/2003 | Kotchick et al. | 455/566 |

OTHER PUBLICATIONS

Crivello et al., "Redox Cationic Polymerization: The Diaryliodonium Salt/Ascorbate Redox Couple", Journal of Polymer Science: Polymer Chemistry Edition, vol. 19, pp. 539–548, (1981).

Crivello et al., "Redox–Initiated Cationic Polymerization: The Diaryliodonium Salt/Benzoin Redox Couple", Journal of Polymer Science: Polymer Chemistry Edition, vol. 21, pp. 1097–1109, (1983).

Encyclopedia of Polymer Science and Engineering, vol. 13, Wiley–Interscience Publishers, N.Y., (1988).

Encyclopedia of Polymer Science and Technology, vol. 1, John Wiley & Sons, Inc., (1964).

Encyclopedia of PVC, vol. 1, L. I. Nass, Marcel Dekker, (1976), pp. 385–503.

Handbook of Pressure–Sensitive Adhesives Technology, D. Satas, Editor, $2^{nd}$ Edition, Van Nostrand Reinhold, N.Y., (1989).

Holländer et al., "Chemical Dehydrochlorination of Poly(Vinyl Chloride). Dehydrochlorination by Alkali Alkoxides", Eur. Polym. J., vol. 27, No. 9, pp. 959–963, (1991).

Leplyanin et al., "Phase–transfer Catalysis in Reactions with the Participation of Polyvinyl Chloride", Russian Chemical Bulletin, vol. 44, No. 10, pp. 1805–1814, (1995).

Mayer et al., "Contribution to the Mechanism of Thermal Destruction of Polyvinyl Chloride and Polyvinyl Acetate by Studies of Model Substances", Chemistry and Industry, pp. 508–509, (1965).

Morio et al., "Thermoinitiated Cationic Polymerization of Epoxy Resins by Sulfonium Salts", Journal of Applied Polymer Science, vol. 32, pp. 5727–5732, (1986).

Pathak et al., "Microstructures of Poly(alkyl $\alpha$–chloroacrylate) Determined by $^{13}$C and $^{1}$H NMR", Macromolecules, vol. 19, No. 4, pp. 1035–1042, (1986).

Van Der Ven et al., "Thermal Degradation of Poly(vinyl chloride): The Accelerating Effect of Hydrogen Chloride", Die Angewandte Makromolekulare Chemie 8, (1969), pp. 143–152, (Nr. 94).

Wakabayashi et al., "Studies on s–Triazines. I. Cotrimerization of Trichloroacetonitrile with Other Nitriles", Bulletin of the Chemical Society of Japan, vol. 42, pp. 2924–2930, (1969).

Wan et al., "Halogen Precursor Route to Poly[2,3–diphenyl–p–phenylene)vinylene] (DP–PPV): Synthesis, Photoluminescence, Electroluminescence, and Photoconductivity", Macromolecules, vol. 30, No. 21, pp. 6567–6574, (1997).

U.S. Appl. No. 10/074,874, filed Feb. 12, 2002, Process for Preparing a K–Type Polarizer.

U.S. Appl. No. 10/117,630, filed Apr. 4, 2002, K–Type Polarizer and Preparation Thereof.

* cited by examiner

K-TYPE POLARIZER AND PREPARATION THEREOF

FIELD OF THE INVENTION

The present invention is directed at a process for preparing a K-type polarizer characterized by a uniaxially oriented film of poly(vinylalcohol) having light polarizing (dichroic) blocks of conjugated poly(acetylene).

BACKGROUND

Dichroic polarizers are absorptive, linear polarizers having a vectoral anisotropy in the absorption of incident light. The polarizer, therefore, has the property of differential absorption (and transmission) of the components of an incident beam of light depending on the direction of vibration of the components. Generally, the polarizer will transmit radiant energy along one electromagnetic vector and absorb energy along a perpendicular electromagnetic vector. A beam of incident light, on entering the dichroic polarizer, encounters two different absorption coefficients, one low and one high so that the emergent light vibrates substantially in the direction of low absorption (high transmission).

The development of synthetic polarizers has made possible the widespread utility of light-polarizing elements for a wide variety of applications, such as in liquid crystal display screens in which crossed polarizers are used in conjunction with an addressable liquid crystal material to provide the basis for image formation. Polarizers have also been used in many optical applications, such as to reduce glare or the brightness of specular reflection in photography or CRT monitors to reduce glare.

Among the known synthetic polarizers are "K-type" polarizers in which the linear dichroic light polarizing materials are prepared by dehydration of poly(vinyl alcohol). K-type polarizers may also be known as inherent polarizers since the absorbing chromophore is the result of conjugation in the polymer backbone, rather than due to dyes added to the polymer matrix. These polarizers comprise a sheet of oriented poly(vinyl alcohol) having light polarizing (dichroic) molecules of poly(acetylene) blocks (i.e. $—[CH=CH—]_n$ formed by heating the oriented poly(vinyl alcohol) sheet in the presence of a dehydration catalyst such as vapors of aqueous hydrochloric acid. By orienting the poly(vinyl alcohol) matrix uniaxially the transition moments of the chromophores, the conjugated poly(acetylene) blocks, are also oriented and the material becomes visibly dichroic.

While K-type polarizers can be made by conventional acid processes, these processes necessarily involve the handling of, and potential exposure to, hazardous quantities of acid, usually hydrochloric acid. Additionally, the vapor-phase acid processes can result in non-uniform catalytic dehydration, which can lead to streaking or mottling of the polarizer, rendering it unsuitable for many precision optical applications. See, for example U.S. Pat. No. 5,773,834 (Kadaba et al.). Hence, there is a need for a process for preparing K-type polarizers that does not use large quantities of hazardous and corrosive acids (such as HCl vapors) to effect dehydration and can produce high quality, uniform polarizers.

SUMMARY OF THE INVENTION

The present invention provides a process for preparing a polarizer whereby a pre-polarizing article comprising an oriented, vinylalcohol polymer film layer, and an acid donor layer comprising a thermal acid generator, is exposed to thermal energy at a temperature sufficient to effect partial dehydration of the vinylalcohol polymer to a vinylalcohol/poly(acetylene) copolymer. When exposed to thermal energy, the thermal acid generator releases one or more molecules of acid. The incipient acid then reacts catalytically with the vinylalcohol polymer to dehydrate it, producing a vinylene segment (i.e. —CH=CH—, which may also be referred to as poly(acetylene) blocks) along the chain of the vinylalcohol polymer. As the reaction proceeds, these vinylene segments grow in number, produce varying lengths of conjugated vinylene segments, which are distributed relatively uniformly in the polymer matrix. For example, the polymer resulting from partially dehydrated poly (vinylalcohol) may have the general structure:

$$—(CH_2—\underset{\displaystyle OH}{\underset{|}{CH}})_a—(CH=CH)_b—$$

where $—(CH_2—CHOH—)_a—$ represent blocks of poly (vinyl alcohol), $—(CH=CH)_b—$ represents conjugated blocks of poly(acetylene), a and b are numbers such that a+b is at least 500, preferably at least 1000, a>b, and b is sufficiently large to produce a conjugated chromophore. Generally b is about 2 to 30. It will be understood that a particular polymer chain may comprise more than one of the above blocks. The conjugated blocks of $—(CH=CH)_b—$, which may be randomly distributed on the polymer chains, may also be referred to as vinylene blocks or poly(acetylene) herein.

The orientation of the polymer chains in combination with the concentration of the blocks of conjugated vinylene imparts a dichroism to the film layer. Concurrent with, or subsequent to, the thermal reaction of the thermal acid generator, the article may be further heated at a temperature, and for a time, sufficient to effect the desired degree of dehydration and concurrent production of conjugated vinylene blocks (poly(acetylene) blocks).

The present invention provides a pre-polarizer article comprising an oriented vinyl alcohol polymer layer and an acid donor layer. The thermal acid generator is dissolved or dispersed in the donor layer, or may comprise a coating of the thermal acid generator on the vinyl alcohol polymer layer. Upon heating the incipient acid diffuses into the adjacent vinylalcohol polymer matrix to effect partial dehydration of the vinylalcohol polymer to conjugated vinylene poly(acetylene) segments. As used herein "pre-polarizer" refers to an article having the aforementioned construction, and which, upon heating, is converted to a K-type polarizer. Once converted to a polarizer, the donor layer and/or support layer may optionally be removed. The pre-polarizer article may further include a support layer for providing mechanical strength to the vinylalcohol polymer layer. The pre-polarizer article may further include a barrier layer for directing the diffusion of the incipient acid molecules and/or reducing loss of the acid from the exposed surfaces, and/or improving moisture resistance. The pre-polarizer article may further include an adhesive layer for securing the pre-polarizer, or the subsequently generated polarizer to a substrate. Advantageously the pre-polarizer allows one to produce custom polarizers with specified patterns or indicia, or with custom optical properties on an as-needed basis.

The method of the present invention overcomes deficiencies of the prior art by avoiding the use of large quantities of corrosive acid, whether in baths, in fuming processes, or as coatings in the processing steps. The use of a thermal acid generator allows one to reduce the amount of acid necessary to effect the desired dehydration (relative to prior art), reducing potential hazardous exposure to the acid, while the production of the thermally-generated acid can easily be controlled by control of the temperature and duration of the heating step(s). The method advantageously can produce high quality, uniform polarizers using conventional processing equipment and readily available polymers and thermal acid generators. Further, the method may be used to produce polarizers bearing preselected patterns by pattern coating the thermal acid generator.

DETAILED DESCRIPTION

Figure 1:
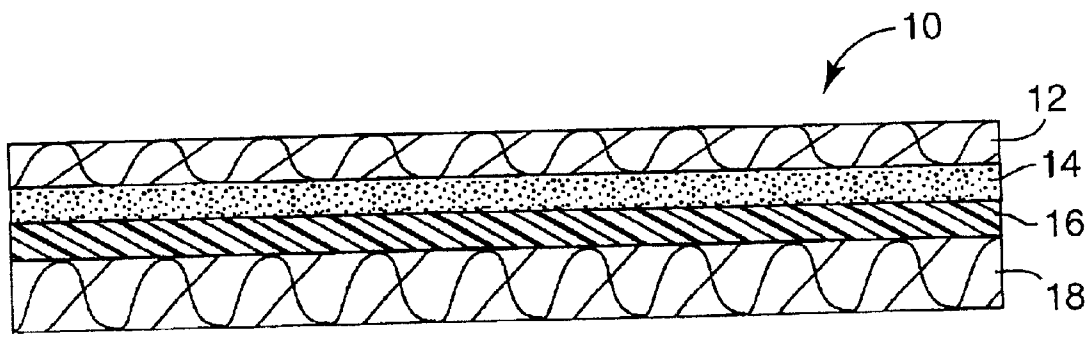
FIG. 1 is a cross section of the prepolarizer of the invention

The present polarizer may be made by partial dehydration of an oriented vinylalcohol polymer film by heating in the presence of a thermal acid generator. Vinylalcohol polymers include any linear 1,3-polyhydroxylated polymer or copolymer, or derivative thereof that may be dehydrated to a linear, conjugated vinylic polymer. Useful vinylalcohol polymers include polymers and copolymers of units of the formula:

$$-(CH_2-\underset{\underset{OR'}{|}}{C}R)- \qquad \text{(I)}$$

wherein R is H, a $C_1$–$C_8$ alkyl, or an aryl group; and R' is H, or a hydrolysable functional group such as a $C_1$–$C_8$ acyl group. Preferably, R and R' are H. In addition to poly(vinyl alcohol) polymers and copolymers, specifically contemplated are polyvinyl acetals and ketals and esters. Useful co-monomers that may be polymerized with the vinylalcohol monomers to produce vinylalcohol copolymers may include any free-radically polymerizable monomers including olefins, such as ethylene, propylene and butylene, acrylates and methacrylates such as methyl (meth)acrylate, vinyl acetates and styrenes. Specifically contemplated for use in the present invention are copolymers of ethylene and vinylalcohol. Generally, the amount of co-monomer is less than 30 mol % and is preferably less than 10 mol %. Higher amounts may retard the formation of conjugated vinylene blocks (poly(acetylene) blocks) and deleteriously affect the performance of the polarizer.

The preferred vinylalcohol polymers are homo- and copolymers of polyvinyl alcohol. Most preferred are polyvinyl alcohol homopolymers. Commercially available polyvinyl alcohols, such as those available from Celanese Chemicals, Inc., Dallas, Tex., under the tradename CELVOL, are classified by viscosity and percent hydrolysis. Polyvinyl alcohols having low viscosities are preferred for ease of coating, while having a sufficiently high molecular weight to provide adequate moisture resistance and good mechanical properties.

Melt-processible polyvinyl alcohol may also be used in this invention. The melt processible vinylalcohol polymers are plasticized to enhance their thermal stability and allow them to be extruded or melt-processed. The plasticizer can be added externally or in the vinylalcohol polymer chain, i.e., the plasticizer is polymerized or grafted onto the vinylalcohol polymer backbone.

Vinylalcohol polymers that can be externally plasticized include commercially available products such as MOWIOL 26–88 and MOWIOL 23–88 vinylalcohol polymer resin available from Clariant Corp., Charlotte, N.C. These MOWIOL vinylalcohol polymer resins have a degree of hydrolysis of 88%. MOWIOL 26–88 vinylalcohol polymer resin has a degree polymerization of 2100 and a molecular weight of about 103,000 g/mol.

Plasticizers useful in externally plasticizing vinylalcohol polymer are high boiling, water-soluble, organic compounds having hydroxyl groups. Examples of such compounds include glycerol, polyethylene glycols such as triethylene glycol and diethylene glycol, trimethylol propane, and combinations thereof. Water is also useful as a plasticizer. The amount of plasticizer to be added varies with the molecular weight of the vinylalcohol polymer. In general, the plasticizer will be added in amounts of between about 5% to about 30%, and preferably between about 7% to about 25%. Lower molecular weight vinylalcohol polymers typically require less plasticizer than higher molecular weight vinylalcohol polymers. Other additives for compounding externally plasticized vinylalcohol polymers include processing aids (i.e. MOWILITH DS resin from Hoechst A. G.), anti-blocking agents (i.e., stearic acid, hydrophobic silica), colorants, and the like.

Externally plasticized vinylalcohol polymers are compounded by slowly adding the organic plasticizer (and typically water) to the vinylalcohol polymer powder or pellets under constant mixing until the plasticizer is incorporated into the vinylalcohol polymer, which occurs when the batch reaches a temperature of from about 82° C.(180° F.) to about 121° C.(250 F.). The lower the molecular weight of the vinylalcohol polymer resin, the lower the maximum batch temperature required to incorporate the plasticizer. The batch is held at that temperature for about 5 to 6 minutes. The batch is then cooled to about between 71° C.(160° F.) and 93° C.(200° F.) at which time an antiblocking agent can be added. The batch is further cooled to about 66° C.(150° F.) at which time the vinylalcohol polymer granulates can be removed from the mixer and extruded.

The compounding steps used to externally plasticize the vinylalcohol polymer can be eliminated when an internally plasticized vinylalcohol polymer is made except where it is desirable to add colorants, etc. Useful internally plasticized vinylalcohol polymers are commercially available. Such products include VINEX 2034 and VINEX 2025, both available from Celanese Inc.

The VINEX trademark from Celanese represents a unique family of thermoplastic, water-soluble, polyvinylalcohol resins. Specifically, the VINEX 2000 series including VINEX 2034 and VINEX 2025 represent internally plasticized cold and hot water soluble polyvinylalcohol copolymer resins. Such internally plasticized vinylalcohol copolymers are described in U.S. Pat. No. 4,948,857 herein incorporated by reference. Such copolymers have the following general formula:

(II)

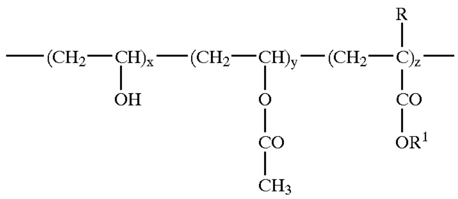

where R is hydrogen or methyl;

$R^1$ is a $C_6$–$C_{18}$ alkyl group y is 0to30 mol %;

z is 0.5 to 8 mol %; and x is 70 to 99.5 mol %.

As stated in U.S. Pat. No. 4,948,857 these copolymers are easy to prepare and offer a polymer having good thermoplastic and thermal stability properties. These copolymers retain the strength properties of poly(vinyl alcohol) while also exhibiting increased flexibility. The acrylate monomer represented in the above formula (II) gives the copolymer its internal plasticization effect. The degree of polymerization of the copolymers can range from about 100 up to 2500, but is preferably between about 200 and 800. The degree of polymerization is defined as the ratio of molecular weight of the total polymer to the molecular weight of the unit as referenced in formula I. Other internally plasticized poly (vinylalcohol) copolymer resins and preparation of these resins are discussed in U.S. Pat. No. 4,772,663. "VINEX" 2034 resin has a melt index typically of about 8.0 g/10 mins. and a glass transition temperature of about 30° C.(86° F.). "VINEX" 2025 resin has a melt index typically of 24 g/10 mins and a glass transition temperature of about 29° C.(84° F.).

Poly(vinyl alcohols) and copolymers thereof, are commercially available with varying degrees of hydrolysis, i.e., from about 50% to 99.5+%. Preferred poly(vinyl alcohols) have a degree of hydrolysis of about 80–99%. In general, the higher the degree of hydrolysis, the better the polarizer properties. Also, poly(vinyl alcohols) with a higher degree of hydrolysis have better moisture resistance. Higher molecular weight poly(vinyl alcohols) also have better moisture resistance, but increased viscosity. In the practice of the invention, it is desirable to find a balance of properties in which the poly(vinyl alcohol) has sufficient moisture resistance, can be handled easily in the coating process (knife coating, roll coating, die coating, curtain coating, etc.), and can be readily oriented. Most commercial grades of poly(vinylalcohol) contain several percent residual water and unhydrolyzed poly(vinyl acetate).

The acid donor layer comprises a separate layer adjacent to the vinylalcohol polymer layer. In the simplest embodiment, the donor layer may comprise a coating of the thermal acid generator on a surface of the vinylalcohol polymer layer, or the thermal acid generator may be dissolved or dispersed in an adjacent polymer layer. The thermal acid generator may also be coated as a pre-selected pattern to produce a patterned polarizer.

If the acid donor layer comprises a coating of the thermal acid generator on a surface of the vinylalcohol polymer layer, the coating may be an intermediate layer between the vinylalcohol polymer layer and a barrier, support or adhesive layer. Advantageously, the thermal acid generator may be pattern coated on the vinylalcohol polymer layer, which may permit the preparation of patterned polarizers. In such cases, the thickness of the donor layer may be very thin; on the order of a few microns If the acid donor layer comprises the thermal acid generator dissolved or dispersed in an adjacent polymer layer, the polymer may be chosen from any polymer that is non-reactive toward both the thermal acid generator, and incipient acid generated therefrom, and allows diffusion through the polymer matrix into the adjacent vinylalcohol polymer layer. Generally the acid donor layer comprises a coating of a non-basic polymer, which has a high rate of permeability of the incipient acid through the matrix. The donor layer may comprise a hydrophobic polymer. A "hydrophobic" polymer may be defined as a polymer that is substantially insoluble in and will not swell appreciably in water. The donor layer may also comprise an amorphous polymer layer. The rate of permeability is a function of the combination of a low rate of absorption of the incipient acid by the matrix, and high rate of diffusion through the matrix and a high rate of desorption from the interface of the donor layer and into the vinylalcohol polymer layer. Less permeable polymers may also be used for the donor layer, provided a barrier layer is used to prevent the loss of acid from the surface(s). The thickness of such a donor layer may be from about 0.1 to 5 mils (2.5 to 125 microns). Generally, the amount of thermal acid generator in the donor layer is at least about 0.1, preferably at least about 1 wt. %, relative to the weight of the donor layer polymer.

Because the solubility of the incipient acid in, and the diffusion of the incipient acid through the polymer matrix is a function of Henry's and Fick's laws respectively, the $T_g$ of the acid donor layer is preferably at or below 25° C., and is more preferably below about 0° C. Polymers in the glassy state are generally less permeable than those in the rubbery state, so polymers in the rubbery state are useful as donor layers.

As the process of the invention may include a further heating step (in addition to the heating step to initiate the thermal acid generator) whereby the article is subsequently heated to effect dehydration of the vinylalcohol polymer.

In one embodiment, the donor layer may be coated on a surface of the oriented vinylalcohol polymer. Such coating methods may include solution coating from solvent dispersion or solution. Alternatively the donor layer may be coated from the melt, coextruded, or a separately prepared donor layer may be laminated or bonded to the vinylalcohol polymer layer by heat, pressure, or by means of adhesives. If adhesives are used, the intermediate adhesive layers should not deleteriously affect the diffusion of the incipient acid from the donor layer to the vinylalcohol polymer layer.

In one embodiment, the donor layer may be coated on a surface of an unoriented vinylalcohol polymer layer and subsequently oriented. However, heating to effect orientation of the vinylalcohol polymer layer may prematurely initiate the thermal acid generator, so it is preferred to coat, bond or otherwise affix the donor layer to the oriented vinylalcohol polymer layer. Further, orientation of the donor layer may reduce the permeability to the incipient acid. However, when the donor layer comprises a vinyl halide polymer, orientation of the vinyl halide polymer layer may enhance the production of acid.

In one embodiment the donor layer may comprise a layer of pressure sensitive adhesive having the thermal acid generator dissolved or dispersed therein. The adhesive donor layer may be coated onto a surface of the vinylalcohol polymer layer, which may be oriented or subsequently oriented as previously described. On thermal activation and resultant dehydration of the vinylalcohol polymer, such an embodiment advantageously provides a polarizing article having a pressure sensitive adhesive layer for affixing the polarizer to a substrate. Useful adhesives include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones. Useful adhesives are described in more detail below.

The acid donor layer may also be releasably affixed to the vinylalcohol polymer layer. Useful means for releasably affixing the donor layer include: selection of an adhesive having a low affinity for the vinylalcohol polymer, the use of a low-adhesion backsize intermediate layer, using techniques to render the layer non-tacky, such as inducing excessive cross-linking, or by selection of an adhesive which may be dissolved in a solvent which is a non-solvent for the vinylalcohol polymer. By releasably affixing the donor layer, the adjacent vinylalcohol polymer layer may be dehydrated to produce poly(acetylene) blocks, then removed to prevent further release of acid and further dehydration of the vinylalcohol polymer. In one useful embodiment, the polarizer may comprise the construction support layer/vinylalcohol polymer layer/donor layer. In this construction the article may be exposed to thermal energy to effect the desired degree of dehydration, then the donor layer may be removed.

The pre-polarizer article may comprise two or more acid donor layers. In a preferred embodiment, a pre-polarizer is provided comprising two acid donor layers with the vinylalcohol layer disposed therebetween. In this embodiment, the incipient acid generated by heating diffuses to the vinyl alcohol layer from both major surfaces. In another preferred embodiment, the pre-polarizer article may comprise alternate layers of donor layer and vinylalcohol layer.

On exposure to thermal energy, thermal acid generators undergo a fragmentation reaction and release one or more molecules of Lewis or Brönsted acid which diffuses from the donor layer through the vinylalcohol polymer matrix to catalyze the dehydration of the vinylalcohol polymer and form conjugated poly(acetylene) blocks. The released acid molecules may directly or indirectly catalyze the dehydration reaction. By indirectly it is meant that the incipient acid, typically a Lewis acid, may react with hydroxyl groups of the vinylalcohol polymer, or with residual water to produce a Brönsted acid. Useful thermal acid generators are thermally stable up to the activation temperature and do not undergo thermally induced reactions with the donor layer polymer, and are readily dissolved or dispersed therein. Preferred thermal acid generators are those in which the incipient acid has a pKa value of ≦0.

The thermal acid generators include any polymeric or non-polymeric compounds that release one or more molecules of acid on exposure to thermal energy. Useful thermal acid generators have an activation temperature of less than the decomposition temperature of the vinyl alcohol polymer and generally have an activation temperature of 200° C. or less, preferably 170° C. or less. Additionally, the thermal acid generator should have an activation temperature at least 20° C. above the melt temperature of the donor layer, if coated from the melt. As used herein, "activation temperature" is that temperature at which the thermal release of the incipient acid by the thermal acid generator in the donor layer occurs. Typically the thermal acid generator will have an activation temperature from about 50° C. to about 170° C.

One useful class of thermal acid initiators include polymeric or non-polymeric halotriazines. Halogenated triazine compounds substituted by at least one trihalomethyl group are disclosed for example in U.S. Pat. No. 4,505,793 and in U.S. Pat. No. 3,987,037, incorporated herein by reference. Useful halotriazines are represented by the general formula:

(III)

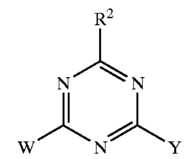

wherein,

W is —X or —$CX_3$, wherein X is a halogen atom (preferably chlorine or bromine), Y is —W, —$NH_2$, —$NHR^3$, —$NR^3_2$, or —$OR^3$, wherein $R^3$ is an alkyl group of 1 to 4 carbon atoms or an aryl group containing 6 to 10 carbon atoms, and $R^2$ is —W, an alkyl group of 1 to 12 carbon atoms, a substituted or unsubstituted aryl group of 6 to 12 carbon atoms, an alkenyl group of 2 to 12 carbon atoms, or a substituted or unsubstituted aralkenyl group containing from 8 to 20 carbon atoms.

The triazine compound may also comprise a polymer having pendant halogenated triazine moieties. Useful polymeric halomethyl-1,3,5-triazine moieties of this invention include those described in U.S. Pat. No. 5,723,513 (Bonham et al.) can be represented by the general formula (IV):

(IV)

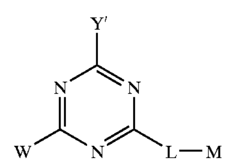

wherein W is —X or —$CX_3$, wherein X is a halogen atom (preferably chlorine or bromine), Y' represents a member selected from the group consisting of -L-, —W, —$NH_2$, —$NHR^3$, —$NR^3_2$, —$OR^3$, and —$R^4$ where each $R^3$ independently represents a substituted or unsubstituted alkyl group of 1 to 4 carbon atoms, a substituted or unsubstituted aryl group of 6 to 10 carbon atoms, and $R^4$ represents a substituted or unsubstituted alkyl group, a substituted or unsubstituted aryl group, a substituted alkenyl group or substituted polyalkenyl group, a substituted alkynyl group or substituted polyalkynyl group, and a substituted or unsubstituted heteroaromatic group, L represents a linking group or covalent bond linking the triazine nucleus to the polymeric moiety, and M represents the polymer chain.

Whenever there is only one L group, the halomethyl-1,3,5-triazine moiety would be considered attached to the polymeric moiety as a pendent or terminal group. If there are two L groups, i.e., if Y=-L-, then the halomethyl-1,3,5-triazine would be considered as being part of the polymeric backbone.

Halomethyl groups that are suitable for the present invention include chloro-, bromo-, and iodomethyl groups, with chloro- and bromomethyl groups being preferred. Trihalomethyl groups are preferred; trichloromethyl and tribromomethyl groups are most preferred.

When $R^3$ or $R^4$ represents an alkyl group, it is preferred that it has one to twelve carbon atoms, more preferably one to six carbon atoms.

When $R^3$ or $R^4$ represents a substituted or unsubstituted aryl group, it is preferred that the group have no more than five fused rings, more preferably no more than three fused rings, such as, for example, phenyl, naphthyl, anthracenyl. When $R^3$ or $R^4$ represents a substituted aryl group, suitable substituents include, but are not limited to, halogen atoms; alkyl groups, preferably having one to twelve carbon atoms; aryl groups; alkoxy groups; aryloxy groups; alkylthio groups; amino groups, carboxylic acid groups and their esters; acyl groups; acyl amino groups; nitro groups; and sulfonic acid groups.

When $R^3$ or $R^4$ represents a substituted aryl group, substituents can include not only the substituents that are suitable when $R^3$ or $R^4$ represents an aryl group, but also a substituted alkenyl or polyalkenyl group, preferably having one to six conjugated carbon-to-carbon double bonds, more preferably one to two conjugated carbon-to-carbon double bonds, and substituted with an aryl or heteroaromatic group (such as phenyl, 4-methoxy-1-naphthyl, 2-benzothiazole); a substituted alkynyl group, preferably having one to three conjugated carbon-to-carbon triple bonds, more preferably one ethynyl group, and substituted with an aryl or heteroaromatic group (such as phenyl, 2-thienyl).

When $R^4$ represents a heteroaromatic group, it is preferred that the group contains a maximum of three fused rings. It is preferred that the heteroatoms be selected from the group consisting of nitrogen, oxygen, sulfur, and combinations thereof. Examples of heteroaromatic groups useful as $R^4$ include, but are not limited to, those derived from a furan group, a thiophene group, a pyrrole group, a pyridine group, an oxazole group, an isooxazole group, a thiazole group, an imidazole group, a benzofuran group, a benzothiophene group, a benzimidazole group, a benzotriazole group, a quinoline group, a benzoxazole group, and a benzothiazole group. Other examples of heteroaromatic groups substituted on halomethyl-1,3,5-triazines are recited in U.S. Pat. No. 3,987,037 and U.S. Pat. No. 4,772,534.

When $R^4$ represents a substituted alkenyl or polyalkenyl group, it is preferred that the group have one to six conjugated carbon-to-carbon double bonds, more preferably one to three conjugated carbon-to-carbon double bonds, and substituted with an aryl or heteroaromatic group (such as styryl, 2-benzoxazole).

When $R^4$ represents a substituted alkynyl group, it is preferred that the group have one to three conjugated carbon-to-carbon triple bonds, more preferably one ethynyl group, and substituted with an aryl or heteroaromatic group (such as phenyl, 2-pyridyl).

When $R^4$ is substituted with a heteroaromatic group, these heteroaromatic groups can be the same as those previously described herein.

When $R^3$ or $R^4$ represents an alkyl group, aryl group, or heteroaromatic group, the particular identity of $R^3$ or $R^4$ and their substituents, if any, is not critical. Certain groups may be selected to impart or modify a physical property of the polymers of this invention, such as solubility, softness, or hardness. Alternatively, $R^4$ and its substituents can be selected to impart a certain spectral response to the triazine moiety within the polymers of this invention, based on their intended use. However, the substituents should not adversely affect the desired optical characteristics of the polarizers of the invention.

L represents a group that links the triazine nucleus to the polymeric moiety. The precise identity of L is not critical, but it should be selected so that it does not interfere with or adversely affect the thermal sensitivity of the compound. L can be formed from a single group or it can be formed from a combination of groups. In addition, L can also be a covalent bond. Groups that are suitable for linking groups include carbamato (—$NHCO_2$—), urea (—NHCONH—), amino (—NH—), amido (—CONH—), aliphatic, e.g., having up to 10 carbon atoms, alkyl, e.g., having up to 10 carbon atoms, haloalkyl, e.g., having up to 10 carbon atoms, alkenyl, e.g., having up to 10 carbon atoms, aryl, e.g., having one ring. styryl, ester (—$CO_2$—), ether (—O—), and combinations thereof. Based on ease of synthesis, the most preferred groups for attachment directly to the triazine nucleus are carbamato, urea, amino, alkenyl, aryl, ester, and ether.

The following groups exemplify typical -L- group combinations (TZN represents a halotriazine moiety, as previously described):

—OCONH-TZN

—$CH_2$OCONH-TZN

—CO-p-$C_6H_4$—NHCONH-TZN

—$CO_2CH_2CH_2$OCONH-TZN

—$CO_2CH_2CH_2$O-p-$C_6H_4$-TZN

—$CO_2CH_2CH_2$O-p-$C_6H_4$—CH═CH-TZN

—$CO_2CH_2CH_2NHCO_2CH_2CH_2$O-m-$C_6H_4$—CH═CH-TZN

—CONHC$(CH_3)_2CO_2CH_2CH_2$O-p-$C_6H_4$—CH═CH—$C_6H_4$-TZN

In many cases, L can be selected to contain a reactive group or polymerizable group that will be useful in polymerization reactions to prepare polymers containing halomethyl-1,3,5-triazine moieties. Typical reactive groups contained in L and useful in polymerization reactions include, but are not limited to, hydroxyls; isocyanates; amines; carboxylic acids; vinyl monomers such as acrylates, methacrylates, vinyl esters, acrylamides, methacrylamides, and styrenes; vinyl ethers; and cyclic ethers. In other cases, L can be selected to contain a reactive group that can combine with a functional group attached to a preformed polymer. Examples of such reactive groups include, but are not limited to, isocyanates, hydroxyls, amines, carboxylic acids, anhydrides, and epoxides.

It is reasonable to conclude that nearly all of the common polymers can be modified to contain a halomethyl-1,3,5-triazine moiety attached to or incorporated within the backbone thereof. Examples of some of the common polymers include, but are not limited to, polyamides, polyesters, polyurethanes, polysiloxanes, phenolic resins, poly(aryl methylenes), polystyrenes, poly(acrylic esters), poly(acrylic acids), polyacrylamides, polyacrylonitrile, polyethylenes, polybutadienes, polyvinyl esters, polyvinyl alcohol, polyvinyl acetals, polyvinyl ethers, polyvinyl pyrrolidone, polyvinyl pyridine, polyvinyl chloride, polyethylene oxides, polypropylene oxides, polyethylene glycols, polypropylene glycols, polyethyleneimines, epoxide resins, phenoxy resins, polytetrahydrofuran, polycaprolactone, poly(styrene sulfonic acid), gelatins, alkylcelluloses, hydroxyalkylcelluloses, carboxymethylcelluloses, starches, and polysaccharides.

The efficiency of the triazine thermal acid generators may be enhanced by the addition of a non-basic nucleophile, such as hydroxyl compound, to the donor layer matrix. In one embodiment a mono, di- or poly-hydroxyl compound may be added to the donor layer. The hydroxyl compound may be polymeric or non-polymeric. In another embodiment, the polymer used in the donor layer matrix may be hydroxyl functional, such as polymers and copolymers of hydroxyethyl acrylate. In yet another embodiment, the polymeric triazine, having pendant triazine functional groups may further comprise pendant hydroxyl groups.

Another useful class of thermal acid initiators comprises poly(phenylene vinylene halide) polymers and copolymers of the following general structure:

(V)

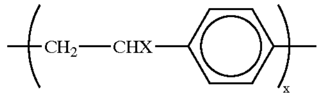

Wherein X is a halogen and x is a number such the compound is polymeric. Such polymers can be prepared by the polymerization of substituted or unsubstituted 1,4-bis (halomethyl)benzene monomers in the presence of bases as described in *Macromolecules* 30, 6567, 1997 and in U.S. Pat. No. 5,558,904,incorporated herein by reference. Each of the 2,3,5 and 6 positions of the benzene ring may be unsubstituted or substituted with a C1 to C10 alkyl, a C1 to C10 alkoxy, an aryl group, an aryloxy, a halogen, or combinations thereof.

Another useful class of thermal acid generators comprises homo-and copolymers of vinyl halides, preferably vinyl chlorides (including polymer mixtures and blends thereof) and optionally an accelerant. Vinyl halide polymers, such as vinyl chloride polymers dehydrohalogenate on heating, with the release of acid and the production of poly(vinylene) segments. The dehydrohalogenation is autocatalytic and may be enhanced by the addition of accelerants that provide catalytic amounts of acid to the vinyl halide polymer. Most commercially available vinyl chloride polymers contain inhibiters to retard the thermal degradation of the polymer. It is preferred that the vinyl halide polymers not contain such inhibitors and/or further contain an accelerant.

Useful vinyl chloride polymers comprise polymerized monomer units of the following structure:

(VI)

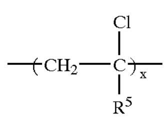

wherein x is a number such that the compound is polymeric and $R^5$ is selected from the group consisting of —H, —$CO_2H$, —$CO_2R^6$, —$O_2CR^6$, —$CONHR^6$, —$CON(R^6)_2$, —CN, —Cl, and —Br, and wherein $R^6$ independently represents a substituted or unsubstituted alkyl group of 1 to 4 carbon atoms, a substituted or unsubstituted aryl group of 6 to 10 carbon atoms. The use of a vinyl halide polymer, such as poly(vinyl chloride) as the thermal acid generator advantageously allows the donor layer to be easily removed after it has been initiated and the vinylalcohol polymer layer dehydrated. With reference to Formula VI, it will be understood that the depicted chlorine atom may be replaced by another halogen atom, such as a bromine atom.

The accelerant is used to lower the thermal activation temperature of the vinyl halide polymers and/or increase the rate at which the vinyl halide polymers generate acid. For example, the temperature at which poly(vinyl chloride) dehydrohalogenates (to release HCl) is about 200° C., so that an accelerant may be used to lower the activation temperature, and/or increase the yield of acid at a given temperature. Useful accelerants include organic or inorganic bases, onium compounds such as ammonium or phosphonium halides. Examples of useful onium halide compounds include tetraalkyl ammonium halides, tetraaryl ammonium halides, mixed alkyl/aryl ammonium halides, tetraalkyl phosphonium halides, tetraaryl phosphonium halides, and mixed alkyl/aryl phosphonium halides. Other useful accelerants include any compound or polymer that thermally releases HCl and which has an activation temperature lower than that of the vinyl chloride polymer. As dehydrohalogenation is autocatalytic, amounts as little as 1 ppm, relative to the amount of vinyl halide polymer, may be used. Generally, the accelerant is used in amounts of 0.1 to 25 wt. %. The accelerant is generally added to the vinyl halide polymer, prior to casting or coating.

Examples of ethylenically-unsaturated comonomers that may be polymerized with the aforementioned vinyl halide monomer include other vinyl halides, alpha-olefins, such as ethylene, propylene, and butylene; vinyl esters, such as vinyl acetate, vinyl propionate, vinyl butyrate, and vinyl hexanoate, or partially hydrolyzed products thereof, such as vinyl alcohol; vinyl ethers, such as methyl vinyl ether, propyl vinyl ether, and butyl vinyl ether; acrylic esters, such as methyl acrylate, ethyl acrylate, methyl methacrylate, and butyl methacrylate; and other monomers, such as acrylonitrile, vinylidene chloride, and dibutyl maleate. Such homo- and copolymers are generally known and many are commercially available. The most preferred vinyl halide polymer used in this invention is the homopolymer of vinyl chloride.

Examples of poly(vinyl chloride) resins that are useful in this invention and are commercially available include GEON™ 92 medium molecular weight, porous suspension poly(vinyl chloride) resin, GEON™ 128 high molecular weight dispersion grade poly(vinyl chloride) resin, both of which are manufactured by The B. F. Goodrich Co., and Diamond™ 450 medium molecular weight poly(vinyl chloride) resin, originally manufactured by Diamond Shamrock Corp., but now available as GEON™ 110X426 FG from The B. F. Goodrich Co. Other commercially available poly(vinyl chloride) resins of these types are equally suitable in the compositions of the invention.

The vinyl chloride containing polymer may be in the form of a dispersion such as plastisol or organosol; see *Encyclopedia of PVC*, Vol. 1,L. I. Nass, Marcel Dekker, 1976, p. 385 for a description of suitable plasticizers and solvents/diluents used in the preparation of plastisols or organosols. These dispersions can be applied to the surface of the oriented vinylalcohol polymer layer using traditional coating or screen printing techniques. Examples of suitable dispersions are poly(vinyl chloride) based inks from Rutland Inc, Pineville, N.C. or poly(vinyl chloride)-based temporary solder masks from Acheson Colloids Company, Port Huron, Mich., such as MINICO™ M-7200.

Alternatively, the poly(vinyl chloride) dispersion may be applied to the surface of unoriented poly(vinyl alcohol) and subsequently heated above the fusion temperature of the poly(vinyl chloride), but below the degradation temperature resulting in a tack-free, poly(vinyl chloride) film on the vinyl alcohol polymer. Subsequent orientation of this construction results in concomitant orientation of the poly(vinyl chloride) donor layer and the vinyl alcohol polymer.

The thermal acid generator is used in amounts sufficient to effect the desired degree of dehydration of the vinylalcohol polymer. The desired degree of dehydration may vary, depending on the desired contrast and the film thickness but is typically in the range of 0.1 to 10%, preferably 1 to 5% of the available hydroxyl groups are converted to vinylene groups (i.e. —$CH_2$—CHOH—→—CH═CH—). The amount of the thermal acid generator necessary to effect the desired degree of dehydration will depend on the number of molecules acid released in thermal decomposition, the pKa of the acid, the permeability of the polymer matrix, the amount of water present in the polymer matrix, the duration of heating and the temperature. Generally the thermal acid generator is used in amounts of at least about 0.1, preferably at least about 1 wt. %, relative to the amount of vinylalcohol polymer.

The article may further comprise a support layer. The oriented vinylalcohol polymer is generally weak in the direction transverse to the direction of orientation, and is readily split or fibrillated when subject to transverse stress. A support layer, when bonded or otherwise affixed to the oriented, vinylalcohol polymer film provides mechanical strength and support to the article so it may be more easily handled and further processed. The support layer may be substantially transparent, translucent or opaque. Preferably the support layer is substantially transparent over the optical region of interest, which is typically 300 to 800 nm. By "substantially transparent" it is meant that the support layer has a transmittance value of at least about 50%, preferably at least 75%, more preferably at least 90% over the optical region of interest. However, in some embodiments the support layer need not be optically transparent, provided that at least one major surface of the vinylalcohol polymer film may be exposed. Thus for example, a support layer bonded to the vinylalcohol polymer layer may not be substantially optically transparent if the opposite surface of the vinylalcohol polymer may be exposed and viewed or if it is removed prior to use.

Any suitable material may be used as a support layer that may be bonded or affixed to the vinylalcohol polymer layer, and which does not deleteriously affect the optical characteristics of the polarizer. Useful transmissive polymers include cellulose esters, such as nitrocellulose and cellulose acetate; polyesters, polycarbonates, and polyacrylates. A preferred polymer is polyethylene terephthalate.

The support layer is typically in the range of 0.5 mil to 20 mil (13 $\mu$m to 510 $\mu$m) in thickness. The support layer and the vinylalcohol polymer layer may be bonded by any suitable means, including lamination, and adhesives. With suitable melt-processible vinylalcohol polymers, the two layers may be coextruded, or the vinylalcohol polymer may be melt-coated onto the surface of the support layer.

In one embodiment, the support layer may be releasably affixed to the oriented vinylalcohol polymer film. The support layer may be releasably affixed to the vinylalcohol polymer layer using, for example, a combination of a pressure sensitive adhesive and a low-adhesion backsize (LAB). Either the adhesive or the low adhesion backsize may be coated on the surface of the support layer. If the pressure sensitive adhesive is coated on the surface of the support layer and a low-adhesion backsize is coated on the surface of the vinylalcohol polymer layer, the adhesive will remain with the support layer upon removal. Conversely if the pressure sensitive adhesive is coated on the surface of the vinylalcohol polymer layer and a low-adhesion backsize is coated on the surface of the support layer, the adhesive will remain with the vinylalcohol polymer layer upon removal.

The polarizer may further comprise one or more barrier layers for directing the diffusion of the incipient acid molecules and/or reducing loss of the acid from the exposed surfaces. A barrier layer may be bonded to one or more exposed surfaces of the oriented, vinylalcohol polymer layer, or may be bonded to an exposed surface of the acid-donor layer if such a layer is present. In one preferred embodiment the polarizing article comprises an acid donor layer having on one major surface an oriented vinylalcohol polymer layer affixed thereto, and a barrier layer affixed to the other major surface of the donor layer. In such a construction, i.e. vinylalcohol polymer layer/donor layer/barrier layer, the loss of incipient acid is prevented by the barrier layer and instead the incipient acid is directed toward the vinylalcohol polymer layer, where it may react to effect dehydration. Such a construction may further comprise a second barrier layer, i.e. barrier layer/vinylalcohol polymer layer/donor layer/barrier layer, where further loss of incipient acid is prevented.

The barrier layer may be prepared from any material that is non-reactive with the incipient acid, and which prevents diffusion losses of the incipient acid upon exposure to light energy. To minimize permeation of the incipient acid through the barrier layer, the $T_g$ of the barrier layer is generally above the operating temperature of the process of this invention, so the barrier layer is in the glassy state as incipient acid is generated. In one embodiment the $T_g$ of the polymer is generally at least 25° C., preferably is at least 50° C. and most preferably at least 100° C. In another embodiment, highly crystalline polymers, such as polypropylene and polyethylene may be used as a barrier layer.

The permeability coefficient of the barrier layer to HCl is less than that of the donor layer and is generally about 20 mol/m*s*Pa×$10^{-15}$ at 23° C. and is preferably less than about 1 mol/m*s*Pa×$10^{-15}$ at 23° C.

Preferably the barrier layer comprises a polymer film layer that is coated, bonded or otherwise affixed to a major surface of the donor layer. If desired, the barrier layer may be releasable affixed to the vinylalcohol polymer film layer, so that it can be removed after exposure to light energy and dehydration of the vinylalcohol polymer. In one embodiment, the pre-polarizer may comprise a construction of oriented vinylalcohol polymer layer and vinyl chloride polymer layer, which may be heated to initiate the thermal decomposition of the vinyl chloride polymer to produce HCl, which diffuses into the vinylalcohol polymer layer effecting the desired dehydration.

The barrier layer may be substantially transparent, translucent or opaque. Preferably the barrier layer is substantially transparent over the optical region of interest, which is typically 300 to 800 nm. However, in some embodiments the barrier layer need not be optically transparent, provided that the barrier layer is removed prior to use.

If desired, the same layer may serve as both a support layer and barrier layer provided the layer both improves the mechanical strength of the article and prevents diffusion of the incipient acid.

If desired an adhesive layer may be applied to a major surface of the polarizer of the invention. As previously described, the donor layer may comprise an adhesive layer having the thermal acid generator dispersed therein. Typically, the adhesive layer would be applied to a major surface of the support layer of the polarizer, producing the construction vinylalcohol film layer/support layer/adhesive layer. The adhesive layer may be activated by pressure, heat, solvent or any combination thereof and may be of any type based on a poly($\alpha$-olefin), a block copolymer, an acrylate, a rubber/resin, or a silicone. The adhesive may be applied at conventional coating weights (e.g., 0.0001 to 0.02 g/cm$^2$) using any conventional coating means such a rotary rod die, slot die or a gravure roll. The support layer may also be treated with a conventional primer coating, and/or activated by flame or corona discharge, and/or by another surface treatment to enhance adhesion of the adhesive layer thereto.

When a pressure sensitive adhesive (psa) layer is used, pressure sensitive adhesives useful in the present invention can be self-tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-($\alpha$-olefins, and tackified silicones. Examples of suitable pressure sensitive adhesives are described in U.S. Pat. No. Re. 24,906 (Ulrich), U.S. Pat. No. 4,833,179 (Young et al.), U.S. Pat. No. 5,209,971 (Babu et al.), U.S. Pat. No. 2,736,721 (Dexter), U.S. Pat. No. 5,461,134 (Leir et al.), U.S. Pat. No. 4,391,687 (Vesley), U.S. 4,330,590 (Vesley) and U.S. Pat. No. 5,112,882 (Babu), the entire disclosure of which is incorporated herein by reference. Others are described in the *Encyclopedia of Polymer Science and Engineering*, vol. 13, Wiley-Interscience Publishers, New. York., 1988,the *Encyclopedia of Polymer Science and Technology*, vol. 1, Interscience Publishers, New. York., 1964 and *Handbook of Pressure-Sensitive Adhesives*, D. Satas, Editor, 2nd Edition, Von Nostrand Reinhold, New. York., 1989.

With reference to FIG. 1, the prepolarizing article 10 comprises an optional barrier layer 12 affixed to a major surface of donor layer 14. The donor layer 14 is affixed to the oriented vinyl alcohol polymer layer 16, supported by optional support layer 18.

The dichroic polarizer may be prepared by solution coating a vinylalcohol polymer, such as polyvinyl alcohol, onto a carrier web, heated roller or support layer. Coating of the dispersion/solution may be accomplished by a variety of known methods, including, for example, coating the substrate using techniques such as shoe coating, extrusion coating, roll coating, curtain coating, or any other coating method capable of providing a uniform coating. The substrate may be coated with a primer or treated with a corona discharge to help anchor the polyvinyl alcohol film to the substrate. After coating, the polyvinyl alcohol film is dried at an elevated temperature. The thickness of the dried coating may vary depending on the optical characteristics desired but is typically from 25 to 125 $\mu$m (1–5 mils).

Alternative to solution coating, the vinylalcohol polymer layer may also be melt-processed. As with solution coating, a melt comprising the vinylalcohol may be cast onto a carrier web, or preferably a support layer. The vinylalcohol polymer film may also be melt-blown. The vinylalcohol polymer melt may also be coextruded with any of the donor layer, the support layer, the barrier layer and/or the adhesive layer by means known in the art.

Coextruded articles can be made using a variety of equipment and a number of melt-processing techniques (typically, extrusion techniques) well known in the art. Such equipment and techniques are disclosed, for example, in U.S. Pat. Nos. 3,565,985 and 3,647,612 (Schrenk et al.),U.S. Pat. Nos. 5,589,122 and 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the types of materials extruded.

The support layer can be primed for adhesion before coating by solution coating on an inorganic or polymeric primer layer, corona treatment, or by physical treatment. Suitable solution based primers for these applications are water-soluble copolyesters commonly used for priming polyethylene terephthalate films such as described in U.S. Pat. No. 4,659,523. The vinylalcohol polymer coating solution should contain between 2 and 20% polymer in water based on weight, with the preferred concentration being between 5 and 15%. The vinyl alcohol polymer generally has a degree of hydrolysis of between 80 and 100%, preferably 95 and 100%, most preferably between 97 and 99.5%.

The donor layer may be coated, as a solution or dispersion containing the thermal acid generator, onto a major surface of the vinylalcohol polymer film (optionally having a support layer). This layer may preferably be added after orientation of the vinylalcohol polymer film. The donor layer may comprise a layer of the neat thermal acid generator, or may comprise a mixture of the thermal acid generator in a polymer matrix. Alternatively, a dispersion of the thermal acid generator in a polymer may be melt-coated onto or coextruded with the vinylalcohol polymer film. Generally, the amount of thermal acid generator is from about 0.1 to 30 wt. %, relative to the weight of the vinylalcohol polymer and may be 0.1 to 20 wt. % of the donor layer polymer matrix.

The vinylalcohol polymer film is oriented, preferably at elevated temperatures, to develop oriented vinylalcohol polymer. The temperature is preferably above the glass transition temperature of the vinylalcohol polymer layer. In general, the temperature should be between 80 and 185° C., preferably between 100 and 185° C. The film may be uniaxially stretched from 2 to 10 times the original dimension. Preferably, the film will be uniaxially stretched from 3 to 7 times the original dimension. The film may be stretched in the machine direction, as with a length orienter, in width using a tenter, or at diagonal angles. Due to the relative weak transverse strength of an oriented vinylalcohol polymer, it is advantageous to cast, laminate or otherwise affix the oriented film onto a support film layer as previously described. However the cast film may be oriented and subsequently bonded or affixed to a support film layer after orientation. Useful methods of orientation are known in the art and reference may be made to U.S. Pat. No. 5,973,834 (Kadaba et al.), U.S. Pat. No. 5,666,223 (Bennett et al.) and U.S. Pat. No. 4,895,769 (Land et al.). If desired, the vinylalcohol polymer layer may be "wet-stretched"; i,e, oriented while in contact with water.

Where the article comprises a layer of vinylalcohol polymer and a donor layer, the same heating step used during the orientation of the vinylalcohol layer may be used to initiate the thermal acid generators and concomitant dehydration. It is preferred however to first orient the vinyl alcohol polymer layer in the absence of the donor layer, subsequently bond, adhere or otherwise affix the donor layer to the oriented vinylalcohol polymer layer, and then thermally initiate the thermal acid generator.

It will be understood however, that in uniaxial orientation, the film may be restrained from shrinking in the lateral direction by means of a tenter apparatus, and such restraint does impose a small degree of biaxial orientation to the film. It is preferred to restrict the stretching in the transverse direction to less than 2X. It is believed that the performance of the polarizer is compromised if the film is oriented in first direction (e.g. in the machine direction) and subsequently oriented in the perpendicular direction more than 2X, as result of restraint from shrinking.

In general, the degree of orientation of the vinylalcohol polymer layer, and the degree of dehydration to conjugated poly(acetylene) blocks is sufficient to impart a maximum dichroic ratio, $R_D$ of greater than 1.1, generally 4 to 10,prior to the stabilization step (described in detail below). The dichroic ratio is defined as: $R_D=A_{\parallel}/A_{\perp}$ where $A_{\parallel}$ and $A_{\perp}$ are the absorption constant in the directions parallel and perpendicular to the direction of orientation respectively. Absorption may be measured using a UV/VIS spectrophotometer having a polarizer placed in both the sample and reference beams. For measurement of the dichroic ratio (the dichroic ratio averaged over the spectral region of interest) the sample and reference beams are both white light. An absorption spectrum between 300 and 800 nm is measured with the orientation axis of a film sample being parallel to the optical axis of the polarizer in the sample beam, and then after rotating the sample polarizer 90°. Thus the absorption at the wavelength of maximum absoptivity, denoted by $A_{=}$ and $A_{\perp}$, are determined, from which $R_D$ can be calculated. The optical axis of the polarizer is the plane of the polarized light that passes through the reference polarizer.

The temperature of the first orientation (or stretching) affects film properties. Orientation temperature control may be achieved by controlling the temperature of heated rolls or by controlling the addition of radiant energy, e.g., by infrared lamps, as is known in the art. A combination of temperature control methods may be utilized.

If desired, the support layer may be oriented in a direction substantially transverse to the direction of orientation of the vinylalcohol polymer film. By substantially transverse, it is meant that the support layer may be oriented in a direction ±45° from the direction of orientation of the vinylalcohol polymer film layer. Such orientation of the support layer provides greater strength in the transverse direction than does an unoriented support layer.

In practice, the support layer may be oriented before or after coating of the vinylalcohol polymer layer. In one embodiment the vinylalcohol polymer may be oriented substantially uniaxially and bonded to an oriented support layer so that the directions of the orientations of the two layers are substantially transverse. In another embodiment, the support layer may oriented in a first direction, the vinylalcohol polymer bonded or coated thereon, and the composite article oriented in a second direction substantially transverse to the direction of first orientation. In this embodiment, the resulting article comprises a biaxially oriented support layer, and a substantially uniaxially oriented vinylalcohol polymer layer.

Generally the support layer, if oriented, will be stretched from about 2X to 10X in a substantially transverse direction, and may further be oriented 2X to 10X in the same direction as the vinylalcohol polymer film, depending on the polymer used and the desired mechanical properties of the polarizing article. After stretching the support layer may be heat set, using conventional means.

The resulting article may be heated to produce the incipient acid, which subsequently diffuses into and/or through the vinylalcohol polymer layer to catalyze dehydration thereof, thereby producing conjugated blocks of poly(acetylene). The article is heated for a time sufficient to impart the desired degree of dehydration, and may range from several minutes to several hours, depending on the acid generator used and the temperature.

The use of a thermal acid generator may produce residue products from the thermal production of acid. For example, a halotriazine produces on heating a vinylalcohol polymer having pendant triazine groups, in addition to the desired acid, as result of the reaction beween the hydroxyl groups of the vinylalcohol polymer and the halotriazine. The use of a vinyl chloride polymer as the thermal acid generator will produce dehydrohalogenated segments (—CH═CH—), along the vinyl chloride polymer chain. Such residues are present in small amounts and do not normally interfere with the desired optical properties of the resulting polarizer. The residues may be found in the donor layer. The residues may be detected by conventional analytical techniques, such as infrared, ultraviolet and NMR spectroscopy, gas or liquid chromatography, mass spectrometry, or a combination of such techniques. Thus, the present invention may comprise an oriented vinylalcohol film layer, a donor layer and detectable amounts of residues from a thermal acid generator.

Where desired, only preselected areas of the article may be exposed to radiant energy, with the result that only corresponding areas of the vinylalcohol polymer are dehydrated to produce poly(acetylene) blocks and a patterned polarizer results. Thus, the present invention provides a polarizer comprising at least one layer of an oriented vinylalcohol polymer/poly(acetylene) copolymer disposed in a pre-selected pattern contiguous with regions of unconverted vinylalcohol polymer. Alternatively, preselected patterned areas may be prepared by pattern coating of the thermal acid generator, such as by pattern coating of the vinyl chloride polymer layer. In such constructions, it is preferred that the donor layer be releasably affixed to the vinylalcohol polymer layer, so that it may be removed and further dehydration prevented.

Concurrent with, or subsequent to, the heating step in which acid is generated, the article may be further heated to promote dehydration of the vinylalcohol polymer with concomitant production of the poly(acetylene) blocks on the vinylalcohol polymer backbone. The temperature and duration of such a heating step can affect the optical properties of the finished polarizer. It will be understood that there is a balance between time and temperature for a given optical property. For example, a lower transmission polarizer may be achieved at a given temperature by using longer exposure times. At a given exposure time, lower transmission may by achieved at higher temperatures. Useful temperatures and times are in the range of 90° C. to about 200° C. and times of a few seconds to several hours. Generally, if a high transmission polarizer is desired, low heating temperatures are preferred. If a lower transmission polarizer is desired then higher heating temperatures should be used. If the heating and irradiation are concurrent, the heating and exposure times need not be the same.

The optical properties of the resulting polarizer may be improved by processes described in U.S. Pat. No. 5,666,223 (Bennett et al). In particular, improvement in photopic and dichroic ratios can be achieved by means of a second orientation step in which the oriented polarizer is stretched a second time from about 5% to about 160%. Such additional orientation may also prevent discoloration of the polarizer and increase the stability to UV radiation.

The process of the present invention may further comprise a stabilization step in which the oriented, irradiated polarizer is contacted with an aqueous borate solution to effect relaxation and crosslinking. Such a step may occur after irradiation and heating, and concurrent with, or subsequent to a second orientation step, if employed. When the polarizer is borated, the stabilizing solution will generally comprise boric acid or alkali borates or mixtures thereof. It is believed that such a boration step provides a layer of polyvinyl orthoborate on the surface of the vinylalcohol polymer.

Generally the concentration of boric acid is greater than the concentration of the borates. Useful solution include, for example, 1 to 6 wt. % borates and 5 to 20 wt % boric acid. The polarizers may be contacted with the borate solutions for from 1 to 10 minutes at temperatures from ambient to about boiling, but is preferably at least about 50 to 85° C. in order to effect swelling of the vinylalcohol film layer prior to crosslinking by the borate.

In addition, the aqueous borate solution washes out the incipient acid, thus preventing further dehydration of the vinylalcohol polymer, and further stabilizes the polarizer against the adverse influences of heat and moisture.

Agents other than borates may be used to stabilize the vinylalcohol film layer. In general any polybasic acid, or derivative thereof such as an ester, can be used in the stabilization step. Another useful stabilization agent is an organosilane, such as those described in U.S. Pat. No. 4,818,624 (Downey), incorporated herein by reference. Such organosilanes are believed to silylate the free hydroxyl groups on the surface of the vinylalcohol polymer. Other means of stabilization agents may include ketal formation with aldehydes, especially dialdehydes and association with inorganic compounds such germanic acids and germanates, titanium salts and esters, chromates and vanadates, and cupric salts and other Group IB salts.

The polarizer of the present invention may be used where polarizer materials have heretofore been used, for example with liquid crystal display panels, sunglasses, sun visors, window glass, glare elimination panels, such as those used with CRT monitors, projection screens and monitors and advertising displays.

EXAMPLES

Except as noted below, all materials used in these examples are commercially available from Aldrich Chemicals, Milwaukee, Wis.

Example 1

A poly(isooctyl acrylate-co-isobornyl acrylate) polymer was prepared by solution polymerization as described below. A mixture of isooctyl acrylate (IOA, 90 parts by weight), isobornyl acrylate (IBA, 10 parts by weight), benzil dimethyl ketal (0.2 parts by weight, available as ESACURE KB-1 from Sartomer, West Chester Pa.), and ethyl acetate (100 parts by weight, available from EM Science, Gibbstown, N.J.) was added to a reaction vessel, sparged with $N_2$ for 15 minutes, and exposed to UV light (two Sylvania F40/350 BL fluorescent tubes, Danvers, Mass.) for 18 hours with agitation. This sample was diluted with 50 parts by weight ethyl acetate and used to prepare the following examples. A series of examples were made by mixing 10 parts by weight of the polymer described above with 0–0.4 parts by weight of cyanuric chloride and 0–1 parts by weight of 1-decanol.

Using an eight-path wet film applicator, each of the solutions were coated at a wet thickness of 0.508 mm onto a previously oriented poly(vinyl alcohol) (PVA) film. The PVA film, having a thickness of 12.7–15.2 μm, had a draw ratio of 4:1 and was laminated to the poly(vinylidene chloride) primed surface of a 0.152 mm thick poly(ethylene terephthalate) (PET) film.

Prior to orientation, the cast PVA film (0.048–0.051 mm thick) was obtained from Eastman Kodak (Rochester, N.Y.) and was comprised of poly(vinyl alcohol) having a degree of polymerization of about 2000 and a level of hydrolysis of 98–99 mole %. The resulting coatings were dried for 5 minutes at 65° C. PET films (0.051 mm thick) with a silicone low-adhesion backsize (LAB) were laminated, LAB side down, to the resulting acid donor layer surfaces to act as a diffusion barrier.

The resulting sandwich constructions were put in an oven for 8 minutes while the temperature ramped up from 133° C. to 156° C. to affect the partial conversion of PVA to polyacetylene. After exposure to heat three of the constructions (examples 1E, 1F, & 1H) turned to a mottled maroon color, indicating the partial dehydration of the PVA to poly(acetylene). The PET/LAB diffusion barrier was removed and the poly(isooctyl acrylate-co-isobomyl acrylate) was washed off the PVA film with ethyl acetate. The UV-VIS absorption spectra of the resulting partially dehydrated PVA films were run in a spectrophotometer (Perkin Elmer Lambda 900 US/VIS/NIR Spectrometer) having a polarizer placed in both the sample and reference beams. The absorption spectrum of the PVA film was measured with the film's orientation axis placed both parallel and then perpendicular to the optical axis of the polarizers. The dichroic ratio ($R_D$) was calculated by dividing the absorbance (A) at the wavelength of maximum absorbance (λmax) of the construction in the parallel position by the absorbance, at the same wavelength, in the perpendicular position ($R_D = A_{=}/A_{\perp}$). The results are shown in Table 1.

TABLE 1

| Example | Cyanuric Chloride Parts by weight | 1-Decanol Parts by weight | Color | $R_D$ | λmax nm |
|---|---|---|---|---|---|
| 1A* | 0 | 0 | none | NA | NA |
| 1B | 0.02 | 0.052 | none | NA | NA |
| 1C | 0.02 | 0 | none | NA | NA |
| 1D | 0.041 | 0.112 | none | NA | NA |
| 1E | 0.121 | 0.312 | mottled, maroon | 3.714 | 552 |
| 1F | 0.201 | 0.517 | mottled, maroon | 1.473 | 552 |
| 1G | 0.201 | 0 | none | NA | NA |
| 1H | 0.401 | 1.038 | mottled, dark maroon | 2.936 | 552 |

*comparative example

Figure 2:
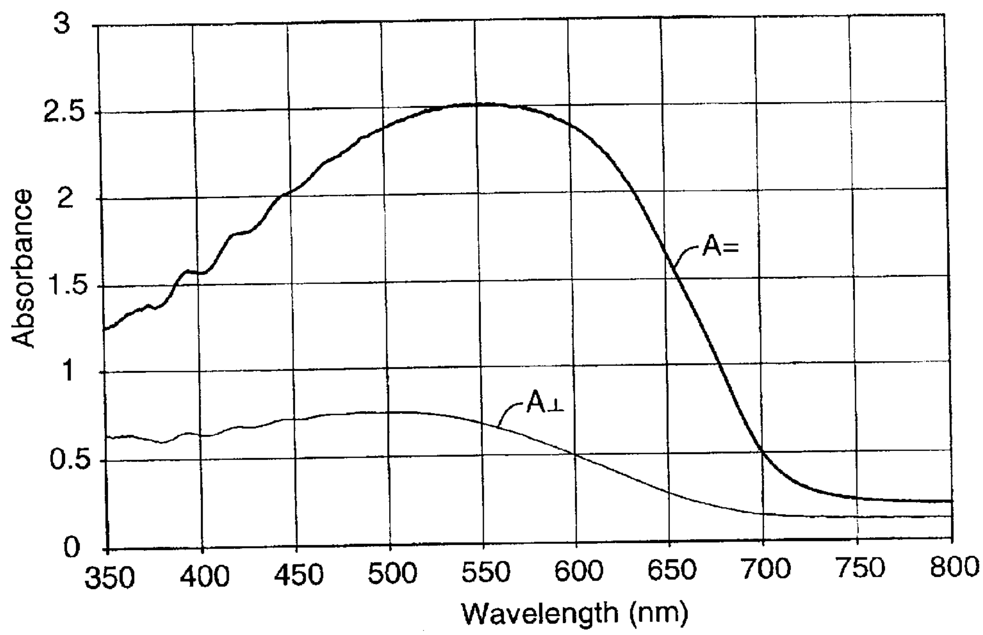
FIG. 2 is a plot of the absorbance vs. wavelength of the polarizer of Example 1E.

These measurements show that the examples that turned to a maroon color were polarizers, as evidenced by their $R_D$ values, which were all significantly greater than 1. They also show that the addition of free alcohol aids in the generation of the acid (Examples 1F & 1G). The UV-VIS absorption spectrum of Example 1E is shown in FIG. 2.

Example 2

A poly(IOA-co-IBA) polymer was made as described in Example 1. By mixing 10 parts by weight of this polymer overnight with 0–0.4 parts by weight of cyanuric chloride and 0–1.05 parts by weight of 1-decanol, a series of examples was made. Sandwich constructions were made with these solutions as described in Example 1. They were then converted by placing them in an oven at 165 ° C. for 15 minutes. After exposure to heat, all the examples except Example 2A, exhibited the maroon color characteristic of the partial dehydration of PVA. Results are summarized in Table 2.

TABLE 2

| Example | Cyanuric Chloride (parts by weight) | 1-Decanol (parts by weight) | Color |
|---|---|---|---|
| 2A* | 0 | 0 | none |
| 2B | 0.02 | 0.057 | uneven light red-brown |
| 2C | 0.041 | 0.109 | uneven red-brown |
| 2D | 0.12 | 0.312 | uneven red-brown |
| 2E | 0.2 | 0.521 | uneven dark red-brown |
| 2F | 0.2 | 0 | uneven red-brown |
| 2G | 0.28 | 0.73 | uneven dark red-brown |
| 2H | 0.401 | 1.049 | uneven dark red-brown |

*comparative example

In particular, examples 2E and 2F demonstrate that free alcohol is advantageous for generating acid in these constructions, but not required.

Example 3

A copolymer of isooctyl acrylate (IOA) and acrylamide was prepared by solution polymerization. A mixture was prepared of 95 parts by weight IOA, 5 parts by weight acrylamide (ACM), 0.4 parts by weight 2,2'-azobis(2-methylbutronitrile), 2 parts by weight 2-propanol (EM Science, Gibbstown, N.J.), and 150 parts by weight ethyl acetate (EM Science, Gibbstown, N.J.). This mixture was sparged with nitrogen gas for 15 minutes then heated at 65° C. for 24 hours with agitation. By mixing 10 parts by weight of the resulting polymer solution with 0.2 parts by weight of cyanuric chloride and 0.52 parts by weight of 1-decanol overnight a sample was made. This mixture turned white overnight. The sandwich construction was prepared and converted as described in Example 1. After heating the example turned to a maroon color characteristic of the partial dehydration of PVA.

Example 4

The following example describes the use of a small molecule without a polymer matrix as an acid donor for generating K-type polarizers. By adding cyanuric chloride, (18.4 g, 0.1 mol), poly(ethylene glycol) monomethyl ether, (55.0 g, 0.1 mol), triethyl amine (10.1 g, 0.1 mol), and toluene (150 ml, EM Science, Gibbstown, N.J.) to a flask with a stir bar and fitted with a condenser, a thermal acid generator was made by refluxing the mixture for 6 hours. The reaction mixture was cooled, filtered to remove the precipitate, and the solvent was removed with a rotary evaporator. The product was a yellow oil, and 69.9 g was collected.

Using an eight-path wet film applicator the yellow oil was coated at a thickness of 0.254 mm on a PVA film (described in Example 1). Part of the sample was covered with PET (0.152 mm thick) and part of the sample was left uncovered. The sample was put in an oven at 165° C. for 5 minutes to affect the partial conversion of the PVA. After heating the oil was washed off with water. Both the covered and the uncovered portions of the sample turned a maroon color characteristic of the partial dehydration of PVA; though the color was uneven.

Example 5

The following example describes the use of an acid-functional polymer donor matrix in combination with an alternative type of triazine-based HCl source to generate a K-type polarizer. A solution polymer containing 90 wt % isooctyl acrylate and 10 wt % acrylic acid was synthesized according to procedures outlined in Example 1. In this polymer solution was dissolved 5 wt % of 2-(3,4-dimethoxyphenyl)-4,6-bis-trichloromethyl-[1,3,5]triazine, prepared as described in U.S. Pat.No. 5,723,513 (Bonham et al.) A K-type polarizer was then produced, using the PVA/PET substrate, coating procedure, PET/LAB barrier layer, and converting procedures described in Example 1. This polarizer exhibited the characteristic maroon color after conversion associated with dehydration of PVA to polyacetylene, albeit somewhat mottled in appearance. The polarizer formed had a $\lambda_{max}$, as high as 525 nm, and $R_D$ as high as 3.35.

Example 6

The following examples describe the use of an alcohol-functional copolymer in combination with cyanuric chloride as a source of HCl to catalyze dehydration of polyvinyl alcohol to polyacetylene, and thereby the creation of a K-type polarizer.

A stock mixture of isobornyl acrylate (IBA, 24.98 g) and isooctyl acrylate (IOA, 225.04 g) was prepared. To this mixture was subsequently added 2-hydroxyethyl methacrylate (HEMA), 2,2'-azobis(2-methylbutyronitrile) (VAZO 67,available from Dupont Chemicals, Wilmington, Del.), and ethyl acetate, as described in the following Table 3.

TABLE 3

| Example | IOA/IBA mixture | HEMA | VAZO 67 | ethyl acetate |
|---|---|---|---|---|
| 6A | 52.5 g | — | 0.0211 g | 97.5 g |
| 6B | 50.0 g | 2.50 g | 0.0218 g | 97.5 g |
| 6C | 47.8 g | 4.77 g | 0.0215 g | 97.5 g |
| 6D | 43.8 g | 8.74 g | 0.0211 g | 97.5 g |

These mixtures were sparged with nitrogen for 20 minutes, and placed in a 70° C. water shaker bath. The mixtures were heated and agitated for ~20 hrs. Approximately 25 g of each solution was subsequently mixed with 0.5 g of cyanuric chloride. These were then coated onto a polyvinyl alcohol oriented film, supported on PET, as described in Example 1. The coating was carried out with an eight-path wet film applicator, with a nominal wet coating thickness of 0.38 mm. The samples heated until dry at 45° C. A layer of PET (0.051 mm thick) treated with a silicone LAB was then laminated to the top of the copolymer layer with light pressure, and the total construction was heated at 165° C. for 10 minutes. The amount of conversion, as indicated by the intensity of the characteristic maroon color, generally increased with the concentration of alcohol, with the darkest color being observed for Example 6D. This color was generally nonuniform across the film. Example 6D had a $\lambda_{max}$ of 552 nm, and $R_D$ of 4.22.

Example 7

The following examples describe the use of polyvinyl chloride (PVC), in combination with an accelerant, as a source of HCl for conversion of polyvinyl alcohol to polyacetylene, thereby creating a K-type polarizer. A series of four formulations were preferred, as summarized in the following table. High Density Clear HD013809 is a PVC-based screen printing organosol available from Rutland Plastic Technologies, Inc. of Pineville, N.C. WONDERMASK P is an acrylic-based peelable solder mask available from Techspray, Inc. of Amarillo, Tex. The formulations were prepared by simple mixing. Tetrabutylammonium bromide was dissolved in water prior to addition to the organosol or solder mask.

TABLE 4

| Example No. | HD013809 | WONDERMASK P | Distilled water | $NBu_4Br$ |
|---|---|---|---|---|
| 7a | 20 g | — | — | — |
| 7b | 20 g | — | 1 g | 2 g |
| 7c* | — | 20 g | — | — |
| 7d* | — | 20 g | 1 g | 2 g |

*comparative example

Figure 3:
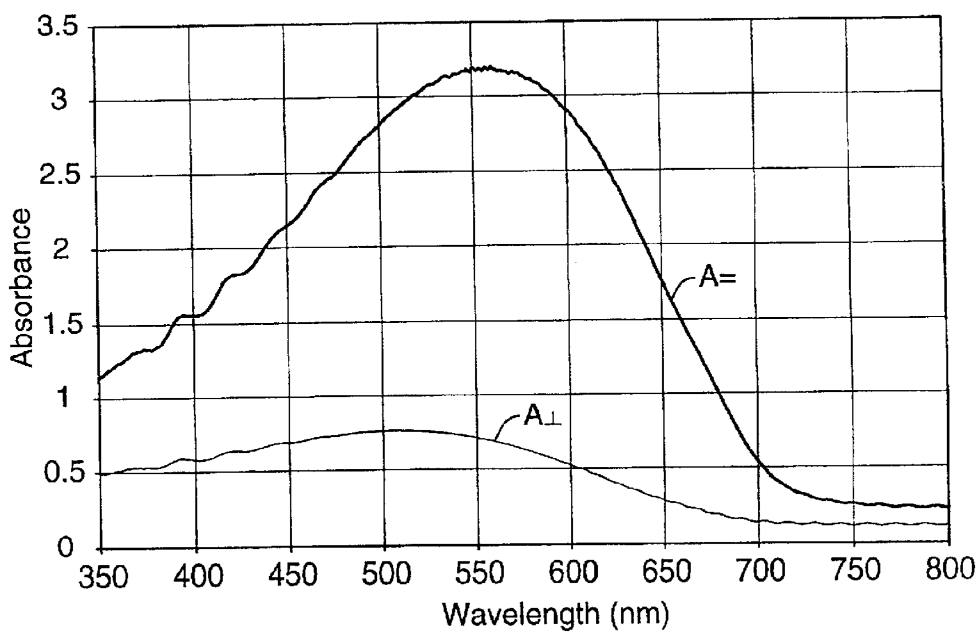
FIG. 3 is a plot of the absorbance vs. wavelength of the polarizer of Example 7b.

After mixing, these formulations were coated onto an oriented polyvinyl alcohol film supported on a polyester backing using an eight-path wet film applicator, with a nominal wet thickness of 0.254 mm. The polyvinyl alcohol film and polyester backing used were described in Example 1. The films were dried at 66° C. for 1 h. At this time, there was no evidence of the maroon color characteristic of the dehydration of polyvinyl alcohol to form polyacetylene. The films were subsequently heated at approximately 163° C. for 3 minutes. After removal of the organosol or solder mask by peeling, neither of comparative examples 7c or 7d showed any evidence of dehydration of polyvinyl alcohol. In contrast, Example 7b exhibited a deep uniform maroon color after removal of the plastisol film. The UV-vis spectrum of this film is shown in FIG. 3. The polarizer formed had a $\lambda_{max}$ of 560 nm, and $R_D$ of 4.68. It is believed that Example 7a failed due to the presence of inhibitors in the commercially available PVC.

Example 8

A chlorine-containing precursor polymer to methoxy-2-ethylhexyloxy poly(phenylene vinylene) (MePPV) was synthesized according to Example 5 of U.S. Pat. No. 5,558,904. The polymer was cast onto oriented PVA as a 10 wt % solution. After allowing the polymer to air dry at ambient conditions, a barrier coating of silicone tape (3M Co., St. Paul, Minn.) was placed over a portion of the film. Upon heating at 165° C. for 10 minutes, K type polarizing film was formed over all areas covered by the polymer, including the area without a barrier coating. This was determined by the formation of a characteristic maroon color associated with dehydration of PVA to polyacetylene and verification with a known polarizer.

Example 9

This example shows the patternability of polarizers created using thermal means to generate HCl in a donor layer. A mixture of PVC-containing High Density Clear HD013809,water, and $NBu_4Br$ was coated on oriented polyvinyl alcohol supported on PET, as described in Example 7. A portion of the organosol film was peeled away from the polyvinyl alcohol after drying at 66° C. for ~45 minutes. The remaining sandwich construction was subsequently heated at 165° C. for 2 minutes. The maroon color characteristic of the formation of polyacetylene blocks in polyvinyl alcohol by dehydration was found only in those areas that had remained covered by the PVC-based film. Thus, polarizer is created only where PVC is present, enabling the formation of a desired pattern in the film.

Example 10

The following example describes the use of a halotriazine functional polymer-based HCl source to generate a K-type polarizer. A syrup containing 80% isooctyl acrylate and 20% isobornyl acrylate was prepared. Separately, a halotriazine functional acrylate was made by reacting 2-hydroxyethyl acrylate with cyanuric chloride (trichlorotriazine) in a 1:1 molar ratio at room temperature. A halotriazine functional polymer was made from a syrup comprised of 90 wt % IOA/IBA syrup, 10 wt % halotriazine functional acrylate and 0.5 wt % DARACUR™ 1173 initiator (Ciba Specialty, Hawthorn, N.Y.). This syrup was coated on an oriented poly(vinyl alcohol) film on a poly(ethylene terephthalate) backing as in Example 1 and was covered with a poly (ethylene terephthalate) release liner as a barrier layer. The construction was exposed to UV light for 30 minutes to polymerize the monomers and then heated to 165° C. for 10 minutes. This polarizer exhibited the characteristic maroon color after conversion associated with dehydration of PVA to polyacetylene.

Example 11

The following example describes the use of 1-decanol in combination with a halotriazine functional polymer as a source of HCl to generate a K-type polarizer. A syrup containing 80% isooctyl acrylate and 20% isobornyl acrylate was prepared. A halotriazine functional acrylate was made by reacting 2-hydroxyethyl acrylate with cyanuric chloride in a 1:1 molar ratio at room temperature. A triazine functional polymer was made from a syrup comprised of 78 wt % IOA/IBA syrup, 13 wt % 1-decanol, 9 wt % halotriazine functional acrylate and 0.5 wt % DARACUR™ 1173 (Ciba Specialty, Hawthorn, N.Y.). This syrup was coated on top of oriented poly(vinyl alcohol) film on a poly(ethylene terephthalate) backing as in Example 1 and was covered with a poly(ethylene terephthalate) release liner used as a barrier layer. The construction was exposed to UV light for 30 minutes and then heated to 165° C. for 10 minutes. This polarizer exhibited the characteristic maroon color after conversion associated with dehydration of PVA to polyacetylene.

Example 12

Methyl α-chloroacrylate was synthesized as reported by Pathak (*Macromolecules* 1986, 19, 1035–1042). A homopolymer of methyl (x-chloroacrylate was made by photochemical polymerization in ethyl acetate with DARACUR ™ 1173 (Ciba Specialty, Hawthorn, N.Y.). A methylene chloride solution of this homopolymer was used to make a film on the surface of and oriented PVA film. The resulting construction was heated to 165° C. for 10 minutes. This polarizer exhibited the characteristic maroon color after conversion associated with dehydration of PVA to polyacetylene in areas with and without a barrier film.

We claim:

1. A process for preparing a polarizer comprising the step of:

heating a pre-polarizing article to activate a thermal acid generator, said pre-polarizing article comprising:

a uniaxially oriented vinylalcohol polymer film layer, and an acid donor layer comprising a thermal acid generator;

wherein said thermal acid generator has an activation temperature of 200° C. or less, and wherein said acid donor layer comprises a mixture of said thermal acid generator and a) a polymer having a glass transition temperature of less than 25° C., or b) an amorphous polymer, or c) a hydrophobic polymer.

2. The process of claim 1, wherein said thermal acid generator comprises halotriazine.

3. The process of claim 1, wherein said donor layer comprises a halotriazine dispersed in a polymer matrix.

4. The process of claim 1 wherein said donor layer comprises a halotriazine and a hydroxy-functional compound dispersed in a polymer matrix.

5. The process of claim 1 wherein said donor layer comprises a halotriazine dispersed in a hydroxyl-functional polymer matrix.

6. The process of claim 1 wherein said donor layer comprises a polymer having pendant halotriazine groups and pendant hydroxyl groups.

7. The process of claim 1, wherein said donor layer comprises a polymer or copolymer of the formula:

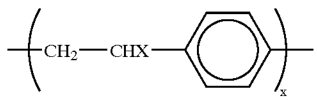

wherein X is a halogen and x is a number such that the compound is polymeric.

8. The process of claim 1 wherein said acid donor layer comprises a coating of said thermal acid generator on said vinylalcohol polymer film layer.

9. The process of claim 1 wherein said acid donor layer is an adhesive layer.

10. The process of claim 1 wherein said vinylalcohol polymer is selected from the group consisting of poly (vinylalcohol), and ethylene/vinyl alcohol copolymers.

11. The process of claim 1 wherein said thermal acid generator is selected from the group of halotriazines and vinyl chloride polymers.

12. The process of claim 1 wherein said thermal acid generator is used in amounts of at least 0.1 wt. %, relative to the amount of vinylalcohol polymer.

13. The process of claim 1 wherein said article comprises a vinylalcohol polymer film layer, a diffusion barrier layer, and said donor layer disposed therebetween.

14. The process of claim 1 wherein said vinylalcohol polymer layer is prepared by solution casting.

15. The process of claim 1 wherein said vinylalcohol polymer layer is prepared by casting from a melt.

16. The process of claim 1 wherein said heating is imparted to said article in a pre-selected pattern.

17. The process of claim 1 wherein said step of heating causes said thermal acid generator to release a Bronsted or Lewis acid, said acid diffusing from said donor layer into said vinylalcohol polymer layer.

18. The process of claim 1 wherein said oriented, vinylalcohol polymer film layer has been uniaxially oriented 2X to 10X.

19. The process of claim 1 further comprising the step of stabilizing said vinylalcohol polymer layer by contact with a silylating agent.

20. The process of claim 1 wherein the acid generated by said thermal acid generator has a pKa value of $\leqq 0$.

21. The process of claim 1 wherein said donor layer is disposed on said vinylalcohol polymer layer in a pre-selected pattern.

22. The process of claim 1 wherein said acid donor layer comprises a vinyl halide polymer and optionally an accelerant.

23. The process of claim 22 wherein said vinyl halide polymer layer comprises homo- and copolymers of vinyl chloride and optionally an accelerant.

24. The process of claim 22 wherein said accelerant comprises ammonium or phosphonium halide compounds.

25. The process of claim 1 wherein said pre-polarizing article is heated at a temperature sufficient to effect partial dehydration of the vinylalcohol polymer to a poly(vinyl alcohol)/poly(acetylene) copolymer.

26. The process of claim 25 wherein the degree of orientation, and the degree of dehydration to a poly(vinyl alcohol)poly(acetylene) copolymer, is sufficient to impart a maximum dichroic ratio, $R_D$, of at least 4.

27. The process of claim 25 wherein the degree of dehydration is 0.1 to 10%.

28. The process of claim 1, further comprising the step of heating said article at 90–200° C.

29. The process of claim 28 wherein said step of heating to effect partial dehydration is subsequent to said step of heating to activate said thermal acid generator.

30. The process of claim 28 wherein said step of heating to effect partial dehydration is concurrent with said step of heating to activate said thermal acid generator.

31. The process of claim 1 wherein said vinylalcohol polymer comprises polymers and copolymers of units of the formula:

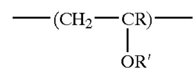

wherein R is H, a $C_1$–$C_8$ alkyl, or an aryl group; and R' is H, or a hydrolyzable functional group.

32. The process of claim 31 comprising copolymers of the formula:

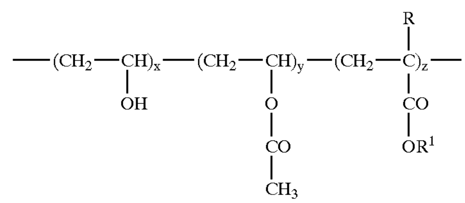

where R is hydrogen or methyl;

$R^1$ is a $C_6$–$C_1$alkyl group y is 0 to 30 mol %;

z is 0.5 to 8 mol %; and x is 70 to 99.5 mol %.

33. The process of claim 1 wherein said article further comprises a support layer.

34. The process of claim 33 wherein said support layer is bonded to said oriented, vinylalcohol polymer film layer.

35. The process of claim 33 wherein said support layer is bonded to said donor layer.

36. The process of claim 1 further comprising the step of stabilizing the vinylalcohol polymer with a polybasic acid or derivative thereof.

37. The process of claim 1 comprising the step of contacting the partially dehydrated polymer film with a borate solution to crosslink the vinylalcohol polymer.

38. The process of claim 37 wherein said film is further stretched while contacting with borate solution.

39. A process for preparing a polarizer comprising the steps of:

a. providing an article comprising an oriented, vinylalcohol polymer film;

b. coating a surface of said oriented, vinylalcohol polymer film with a polymer composition comprising a thermal acid generator;

c. laminating said polymer composition comprising a thermal acid generator with a barrier layer; and d. exposing said vinylalcohol polymer film to thermal energy.

40. The process of claim 39 wherein said article of step a) further comprises a support layer bonded to said oriented, vinylalcohol polymer film.

41. A K-type polarizer comprising at least one layer of an oriented poly(vinyl alcohol)/poly(acetylene) copolymer and an acid donor layer containing residue from a thermal acid generator.

42. The polarizer of claim 41 wherein said acid donor layer comprises a mixture of said residue and a polymer having a glass transition temperature of less than 250° C.

43. The polarizer of claim 41 wherein said acid donor layer comprises a mixture of said residue and an amorphous polymer.

44. The polarizer of claim 41 wherein said donor polymer layer comprises a mixture of said residue and a hydrophobic polymer.

45. The polarizer of claim 41 wherein said donor layer comprises a mixture of said residue and an adhesive.

46. The polarizer of claim 41 wherein said poly(vinyl alcohol)/poly(acetylene) copolymer comprises copolymers of monomers of the formula:

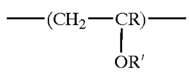

wherein R is H, a $C_1$–$C_8$ alkyl, or an aryl group; and R' is H, or a hydrolysable functional group.

47. The polarizer of claim 41 wherein said poly(vinyl alcohol)/poly(acetylene) copolymer has the general structure:

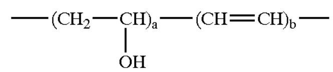

where —$(CH_2—CHOH)_a$— represent blocks of poly(vinyl alcohol), —$(CH{=}CH)_b$— represents conjugated blocks of poly(acetylene), a and b are numbers such that a+b is at least 500, a>b, and b is sufficiently large to produce a conjugated chromophore.

* * * * *

UNITED STATES PATENT AND TRADEMARK OFFICE

CERTIFICATE OF CORRECTION

PATENT NO. : 6,949,207 B2
APPLICATION NO. : 10/117774
DATED : September 27, 2005
INVENTOR(S) : Todd D. Jones It is certified that error appears in the above-identified patent and that said Letters Patent is hereby corrected as shown below:

Col. 5
Line 13, delete "0to30" and insert -- 0 to 30 --, therefor.

Col. 15
Line 10, delete "U.S. 4,330,590" and insert -- U.S. Pat. No. 4,330,590 --, therefor.
Line 15, delete "New. York.," and insert -- New York, --, therefor.
Line 17, delete "New. York.," and insert -- New York, --, therefor.

Col. 19
Line 64, delete "isobomyl" and insert -- isobornyl --, therefor.

Col. 21
Line 55, after "al.)" insert -- . --.

Col. 24
Line 25, delete "(x-chloroacrylate" and insert -- α-chloroacrylate --, therefor.

Col. 25
Line 59, in Claim 26, after "alcohol)" insert -- / --.

Col. 26
Line 26, in Claim 32, delete "$C_6$-$C_1$" and insert -- $C_6$-$C_{18}$ --, therefor.
Line 39, in Claim 37, delete "claim 1" and insert -- claim 36 --, therefor.
Line 64, in Claim 42, delete "250° C." and insert -- 25° C. --, therefor.

Signed and Sealed this

Eighteenth Day of March, 2008

JON W. DUDAS
*Director of the United States Patent and Trademark Office*